(12) United States Patent
Staniewicz et al.

(10) Patent No.: US 9,105,386 B2
(45) Date of Patent: Aug. 11, 2015

(54) ELECTRO-MECHANICAL DEVICE AND ASSOCIATED METHOD OF ASSEMBLY

(75) Inventors: Zbyslaw Staniewicz, Mississauga (CA); Scott Parsons, Toronto (CA); Andrew Malcolm Boyes, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 81 days.

(21) Appl. No.: 13/807,485

(22) PCT Filed: Jun. 23, 2011

(86) PCT No.: PCT/CA2011/000750
§ 371 (c)(1),
(2), (4) Date: Dec. 28, 2012

(87) PCT Pub. No.: WO2012/000089
PCT Pub. Date: Jan. 5, 2012

(65) Prior Publication Data
US 2013/0093547 A1    Apr. 18, 2013

Related U.S. Application Data

(60) Provisional application No. 61/359,968, filed on Jun. 30, 2010.

(51) Int. Cl.
*H01F 3/14*    (2006.01)
*H01F 41/02*    (2006.01)
(Continued)

(52) U.S. Cl.
CPC .................. *H01F 3/14* (2013.01); *H01F 7/121* (2013.01); *H01F 7/1844* (2013.01); *H01F 41/02* (2013.01); *Y10T 29/49004* (2015.01)

(58) Field of Classification Search
CPC ........................................................ H01F 7/121
USPC ......................................... 335/220, 279, 281
See application file for complete search history.

(56) References Cited

U.S. PATENT DOCUMENTS 2,275,839 A * 3/1942 Boehne ......................... 335/220
3,759,232 A * 9/1973 Wahl et al. .................... 123/683
(Continued)

FOREIGN PATENT DOCUMENTS

DE    19927822 C1    10/2000
GB     746773 A *    3/1956
(Continued)

OTHER PUBLICATIONS

PCT/CA2011/000750 Search Report & Written Opinion Sep. 22, 2011.

(Continued)

*Primary Examiner* — Mohamad Musleh
(74) *Attorney, Agent, or Firm* — Millman IP Inc.

(57) ABSTRACT

A method of setting an air gap between an electromagnetic coil and an armature of an electro-mechanical device to be within a desired range includes applying a sensing signal to the electromagnetic coil and monitoring at least one electrical characteristic of the electromagnetic coil. The at least one electrical characteristic is related to a size of the air gap and the sensing signal. The method further includes moving the armature towards the electromagnetic coil to reduce the size of the air gap and stopping movement of the armature towards the electromagnetic coil when the at least one electrical characteristic indicates the size of the air gap is within the desired range.

14 Claims, 5 Drawing Sheets

(51) Int. Cl.
*H01F 7/121* (2006.01)
*H01F 7/18* (2006.01)

(56) References Cited

U.S. PATENT DOCUMENTS

| | | | |
|---|---|---|---|
| 4,498,625 A | | 2/1985 | Schechter |
| 4,629,262 A | * | 12/1986 | Hamilton .................... 310/90.5 |
| 5,583,434 A | | 12/1996 | Moyers et al. |
| 5,732,636 A | | 3/1998 | Wang et al. |
| 5,781,090 A | * | 7/1998 | Goloff et al. ................ 335/276 |
| 6,566,990 B2 | * | 5/2003 | Oyama et al. ................ 335/220 |
| 7,602,271 B2 | * | 10/2009 | York et al. ................... 335/279 |
| 2007/0030619 A1 | | 2/2007 | Ganev |
| 2007/0262838 A1 | | 11/2007 | Niikawa et al. |
| 2009/0264243 A1 | * | 10/2009 | York et al. ................... 475/231 |
| 2010/0122882 A1 | | 5/2010 | Komorowski et al. |
| 2010/0230227 A1 | * | 9/2010 | Parsons et al. ................ 192/65 |

FOREIGN PATENT DOCUMENTS

| | | |
|---|---|---|
| GB | 2391048 A | 1/2004 |
| WO | 2010054487 A1 | 5/2010 |

OTHER PUBLICATIONS

1st Office Action for Chinese Patent Application No. 201180032097.9 (PCT/CA2011/00750), Jan. 30, 2015.

* cited by examiner

ELECTRO-MECHANICAL DEVICE AND ASSOCIATED METHOD OF ASSEMBLY

CROSS-REFERENCE TO RELATED APPLICATION

This application claims the benefit of U.S. Provisional Patent Application No. 61/359,968 filed Jun. 30, 2010. The disclosure of the above-referenced application is incorporated by reference as if fully set forth in detail herein.

INTRODUCTION

The present disclosure relates to an electro-mechanical device and an associated method of assembly. More specifically, the present disclosure relates to an electro-mechanical device that includes a desired air gap and a method of assembly for an electro-mechanical device to obtain a desired air gap.

BACKGROUND

Electra-mechanical devices are used in a wide range of applications. Such devices typically include an electromagnetic coil which can be energized to exert a force on a component formed of magnetic material, hereinafter referred to as an armature. The force exerted on the armature moves the armature and this movement is then used to provide a desired effect, such as operation of a control mechanism, or moving electrical contacts into, or out of, contact.

The amount of electrical current that is required to create a magnetic force in the electromagnetic coil sufficient to move the armature can depend upon a wide variety of factors, including, but not limited to, the design of the coil and the mass of the armature. Another one of the factors determining the amount of electrical current required for desired movement of an armature is the distance between the electromagnetic coil and the armature, which is typically referred to as the "air gap" through which the magnetic force that acts on the armature must pass.

An electro-mechanical device with a smaller air gap will require less electrical current to operate than an otherwise identical device with a larger air gap. A minimum air gap must exist, however, to allow movement of the armature to occur. Thus, where it is desired to limit the electrical current required to operate the electro-mechanical device, it is often desired to provide an air gap of a given size which is less than some maximum value, but more than a minimum value.

For many electro-mechanical devices, assembling the device to obtain a desired air gap is straightforward and a suitable physical measuring device can be employed to properly establish the air gap. In other circumstances, however, it can be problematic to establish a desired air gap. For example, in small electro-mechanical devices, or with electro-mechanical devices occupying tight packaging volumes or enclosures, it may not be possible to position a physical measuring device in the vicinity of the electromagnetic oil and/or armature during assembly.

Accordingly, it is desired to have an electro-mechanical device that includes a desired air gap and a method of assembly for an electro-mechanical device to obtain a desired air gap.

SUMMARY

It is an object of the present disclosure to provide a novel electro-mechanical device and associated method of assembly that obviates or mitigates at least one disadvantage of the prior art.

According to various embodiments of the present disclosure, a method of setting an air gap between an electromagnetic coil and an armature of an electro-mechanical device to be within a desired range is provided. The method includes applying a sensing signal to the electromagnetic coil and monitoring at least one electrical characteristic of the electromagnetic coil. The at least one electrical characteristic is related to a size of the air gap and the sensing signal. The method further includes moving the armature towards the electromagnetic coil to reduce the size of the air gap and stopping movement of the armature towards the electromagnetic coil when the at least one electrical characteristic indicates the size of the air gap is within the desired range.

According to various embodiments of the present disclosure, a method of setting an air gap between an electromagnetic coil and an armature of an electro-mechanical device to be within a desired range is provided. The method includes moving the armature towards the electromagnetic coil to a first position to set a first size of the air gap and stopping movement of the armature towards the electromagnetic coil at the first position. The method further includes applying a sensing signal to the electromagnetic coil when the armature is at the first position and monitoring at least one electrical characteristic of the electromagnetic coil. The at least one electrical characteristic is related to the first size of the air gap and the sensing signal. Further, the method includes determining whether the first size of the air gap is within the desired range based on the at least one electrical characteristic.

According to various embodiments of the present disclosure, a method of setting an air gap between an electromagnetic coil and an armature of an electro-mechanical device to be within a desired range is provided. The method includes applying an alternating current voltage signal to the electromagnetic coil and monitoring a first current drawn by the electromagnetic coil based on the alternating current voltage signal. The method also includes moving the armature towards the electromagnetic coil to reduce the size of the air gap and determining a first current threshold. The first current threshold is related to the size of the air gap being within the desired range. The method further includes comparing the first current drawn by the electromagnetic coil to the first current threshold, determining that the size of the air gap is within the desired range when the first current drawn is below the first current threshold, and stopping movement of the armature towards the electromagnetic coil when the size of the air gap is within the desired range. Additionally, the method includes confirming that the size of the air gap is within the desired range by: (i) applying a direct current voltage signal to the electromagnetic coil and (ii) detecting a change in a second current drawn by the electromagnetic coil based on the direct current voltage signal.

According to various embodiments of the present disclosure, an electro-mechanical device is disclosed. The electro-mechanical device includes an electromagnetic coil and an armature selectively movable between an engaged position and a disengaged position. The armature is engaged with the electromagnetic coil in the engaged position and defines an air gap between the electromagnetic coil and the armature in the disengaged position. The air gap is sized to be within a desired range by an exemplary method. The method includes applying a sensing signal to the electromagnetic coil and monitoring at least one electrical characteristic of the electromagnetic coil. The at least one electrical characteristic is related to a size of the air gap and the sensing signal. The method further includes moving the armature towards the electromagnetic coil to reduce the size of the air gap and stopping movement of the armature towards the electromagnetic coil when the at least one electrical characteristic indicates the size of the air gap is within the desired range.

BRIEF DESCRIPTION OF THE DRAWINGS

Preferred embodiments of the present invention will now be described, by way of example only, with reference to the attached Figures, wherein.

DETAILED DESCRIPTION OF THE VARIOUS EMBODIMENTS

An "air gap" of an electro-mechanical device is typically described as being a solely physical distance. The operation of an electromagnetic circuit, however, is affected by a variety of factors other than the physical air gap, i.e., the physical distance between the electromagnetic coil and the armature. Thus, from an electrical circuit viewpoint, the effective air gap of an electromagnetic device can be thought of as a characteristic that affects the operation of the electromagnetic circuit of the electromagnetic coil and armature. That characteristic depends upon not only a physical distance between the electromagnetic coil and the armature ("physical air gap"), but also other characteristics of the electro-mechanical device (axial or other misalignments between the electromagnetic coil and the armature, differences in the windings and construction of the electromagnetic coil, etc.). Therefore, while a particular assembly of an electromagnetic coil and armature may require a specific minimum voltage and current to move the armature through a physical air gap of a particular size, another assembly of a similar electromagnetic coil and armature may require a different level of current to move the armature through the same "physical air gap." As is discussed further below, the combination of the physical distance between the electromagnetic coil and the armature (the "physical air gap") and the effects of misalignment, manufacturing variations, etc. is referred to herein as the "effective air gap" of the device.

Figure 1:
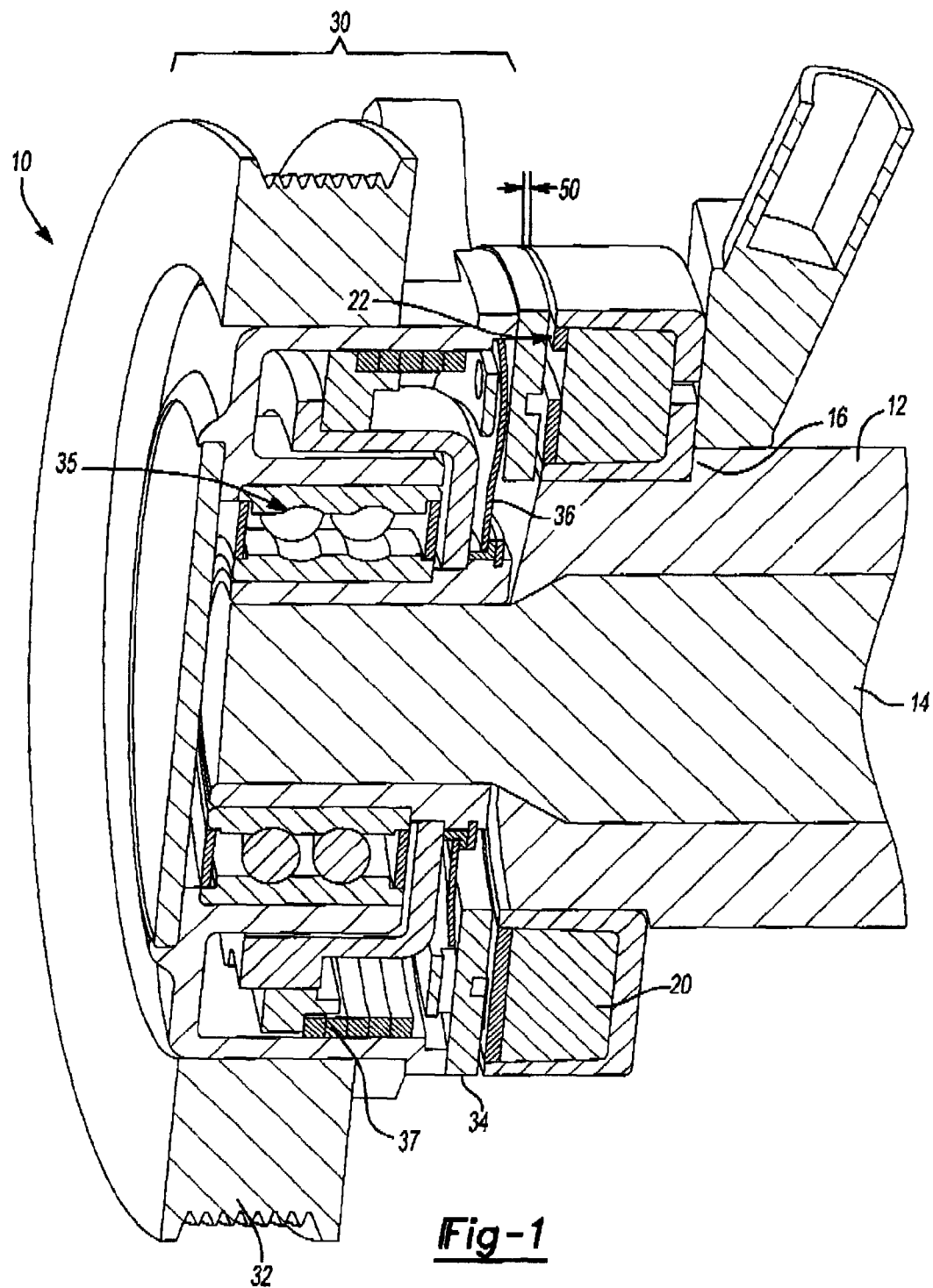
FIG. 1 is a partial sectional view of an exemplary electro-mechanical device according to some embodiments of the present disclosure.

Referring now to FIG. 1, a partial sectional view of an exemplary electro-mechanical device according to some embodiments of the present disclosure is illustrated. Electro-mechanical device 10 can be, for example, an engine driven accessory (such as, a cooling water pump for an internal combustion engine) that includes an electro-mechanical clutch which allows device 10 to be selectively activated and deactivated as required.

The electro-mechanical device 10 can include a base 12 from which a drive shaft 14 extends. The base 12 can include a shoulder 16 that encircles the drive shaft 14. An annular electromagnetic coil 20 can be coupled to the base 12, for example, by being press fit onto the base 12 until the electromagnetic coil 20 abuts the shoulder 16. A clutch assembly 30 can be fixedly coupled to the drive shaft 14 such that the clutch assembly 30 will remain, as positioned, on the drive shaft 14 under all expected operating conditions. For example only, the clutch assembly 30 can be press fit onto drive shaft 14 such that an interference fit is obtained between the clutch assembly 30 and the drive shaft 14.

The clutch assembly 30 can include a drive sheave 32 that, through operation of the clutch assembly 30, selectively engages and disengages with the drive shaft 14. Specifically, when the electromagnetic coil 20 is energized with a suitable electric current, an armature plate 34 is brought into frictional contact with a face 22 of the electromagnetic coil 20 and the drive sheave 32 will disengage from the drive shaft 14. When the electromagnetic coil 20 is de-energized, a return spring 36 can bias the armature plate 34 away from the face 22 such that the drive sheave 32 can re-engage the drive shaft 14. The clutching operation, i.e., the engagement and disengagement of the drive sheave 32 with the drive shaft 14, can be accomplished through the use of a bearing assembly 35 and a wrap spring 37, although the specific details of the clutch assembly 30 are not important to the present disclosure and will therefore not be discussed further herein.

When assembling the electro-mechanical device 10, an appropriate air gap 50 should be obtained such that the armature plate 34 can be engaged and disengaged with the face 22 of the electromagnetic coil 20, i.e., moved between an engaged and disengaged position. In the particular example of the engine driven accessory being described herein, it is desired that the electromagnetic coil 20 creates sufficient magnetic force to move armature plate 34 into frictional contact with the face 22 when the electromagnetic coil 20 is energized with a minimum of nine volts at a maximum of temperature of 120° Celsius, which values can represent an expected worst case operating condition or other limitation. The current required to sufficiently energize the electromagnetic coil 20 to accomplish this can be affected by the construction of the electromagnetic coil 20, the construction of the armature plate 34 and the air gap 50 between them. If the air gap 50 is too large, the current required to move the armature plate 34 into frictional contact with face 22 will exceed the desired maximum current level. It is also important, however, that the armature plate 34 be spaced from the face 22 by some clearance to allow for proper clutching of the electro-mechanical device 10. Accordingly, it is desired that the clutch assembly 30 (and armature 34) be moved towards the face 22 of the electromagnetic coil 20 until the air gap 50 is within a desired range.

Due to the location of the armature plate 34 and the face 22 within the electro-mechanical device 10, it can be difficult or, in some contemplated devices, impossible to make a physical measurement of the physical air gap between the armature plate 34 and the face 22. Furthermore, as described above, the physical air gap is only one factor that affects the proper operation of the electro-mechanical device 10. Other factors that affect the proper operation of the electro-mechanical device 10 include, but are not limited to, axial and/or radial misalignments of the windings of the electromagnetic coil 20, variations in the manufacture of the electromagnetic coil 20 and/or the armature plate 34, and flatness or roughness of the surfaces of the various components of the electromagnetic coil 20 and/or the armature plate 34. For example only, for a first specific electro-mechanical device 10 a physical clearance of 0.4 millimeters may provide the desired effective air gap and electrical characteristics of the desired maximum current, while for a second specific electro-mechanical device 10 a physical clearance of 0.25 millimeters may provide the desired electrical characteristics of the desired maximum current.

Accordingly, while a measurement of a physical air gap may provide an approximation of the desired effective air gap, it may not provide a sufficiently accurate representation of the effective air gap to meet the demanding electrical characteristic requirements for the electro-mechanical device 10. Instead of attempting to create a specific physical air gap between the armature (armature plate 34) and the electromagnetic coil 20, the present disclosure provides for the electromagnetic coil 20 to be used as a sensor to determine and set the desired size of an effective air gap 50.

Figure 2:
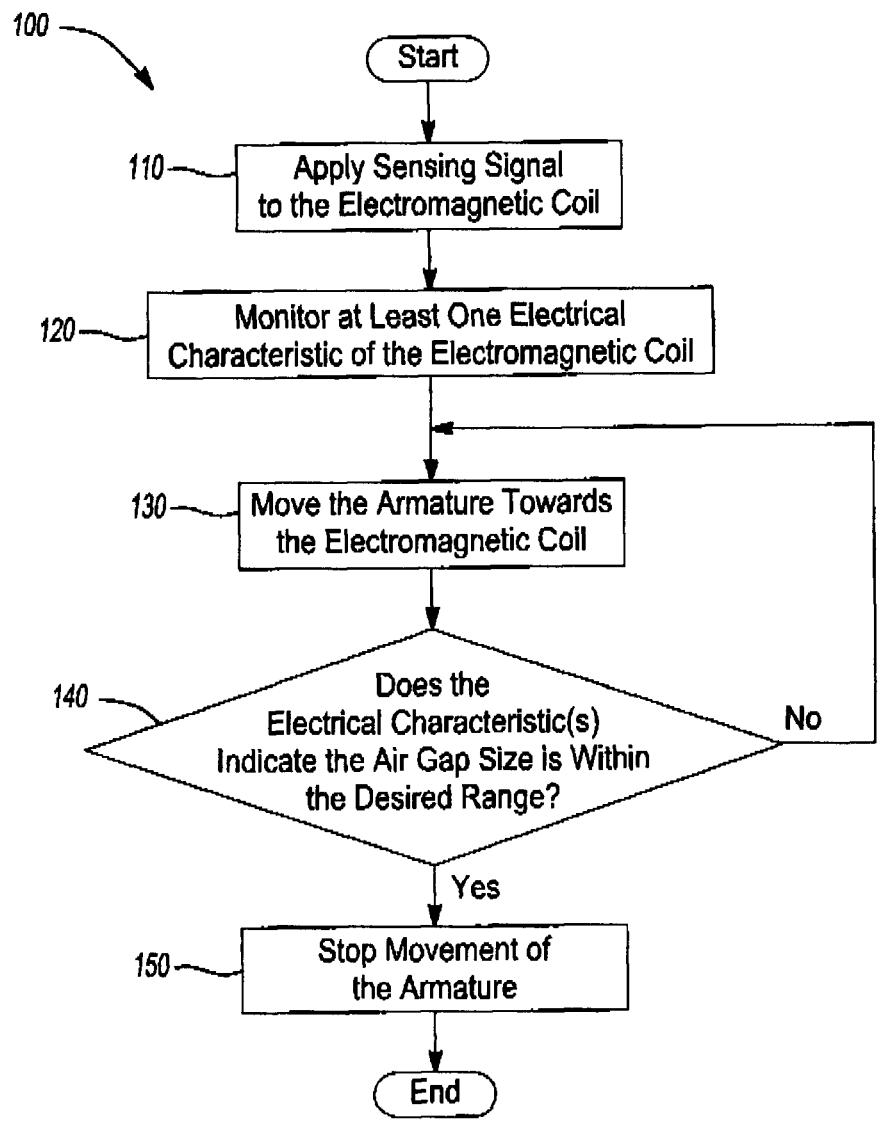
FIG. 2 is a flow chart describing an exemplary method of setting an air gap of an electro-mechanical device (such as the electro-mechanical device of FIG. 1) according to some embodiments of the present disclosure.

Referring now to FIG. 2, a flow chart describing an exemplary method 100 of setting an air gap of an electro-mechanical device according to some embodiments of the present disclosure is illustrated. One skilled in the art will appreciate that, although there are a specific number of steps described in method 100 and these steps are described in a particular order, the method 100 can include more or less steps and the steps can be performed in an order other than as illustrated. The method 100 can be utilized, for example, to assemble the electro-mechanical device 10 including the armature 34 and electromagnetic coil 20 described above. At step 110, a sensing signal is applied to the electromagnetic coil 20. The sensing signal can be any electrical signal, including, but not limited to, an alternating current (AC) voltage signal, a direct current (DC) voltage signal, an AC current signal, a DC current signal, a pulsed voltage signal (triangular wave, square wave, etc.) and a pulsed current signal (triangular wave, square wave, etc.). For example only, in some embodiments the sensing signal is a thirty Hertz sinusoidal five volt signal.

At step 120, at least one electrical characteristic of the electromagnetic coil 20 is monitored. The monitored electrical characteristic(s) is related to the sensing signal and the size of the effective air gap 50. Exemplary electrical characteristics include, but are not limited to, the resulting current supplied to the electromagnetic coil 20 (for example, when the sensing signal is a voltage), the resulting voltage of the electromagnetic coil 20 (for example, when the sensing signal is a current), and the inductance of the electromagnetic coil 20. In the example above where the sensing signal is a thirty Hertz sinusoidal five volt signal, the corresponding current to electromagnetic coil 20 can be monitored. In this example, the initial current supplied to the electromagnetic coil 20 can be a nominal three hundred milliamps.

The armature 34 is moved towards the electromagnetic coil 20 at step 130. The movement of the armature plate 34 towards the electromagnetic coil 20 will increase the inductance of the electromagnetic circuit formed by the electromagnetic coil 20 and the armature 34. Therefore, in the example in which the sensing signal is a thirty Hertz sinusoidal five volt signal, the resulting current that is supplied to the electromagnetic coil 20 will decrease as the armature 34 is moved towards the electromagnetic coil 20. Similarly, for sensing signals other than voltage signals, the increased inductance of the electromagnetic circuit formed by the electromagnetic coil 20 and the armature 34 as the armature 34 gets closer to the electromagnetic coil 20 will affect the electrical characteristic(s) that is monitored at step 120.

The method 100 proceeds to step 140 at which it is determined whether the electrical characteristic(s) that is being monitored (step 120) indicates that the size of the air gap 50 is within a desired range. The desired range is determined to provide an effective air gap 50 small enough to move the armature plate 34 into frictional contact with the face 22 when powering the electromagnetic coil 20 at or below a desired power level and large enough to allow for proper clutching of the electro-mechanical device 10. Whether the air gap 50 is within the desired range can be determined, for example only, based on comparison of the electrical characteristic(s) with previously determined empirical measurements.

In the example above where the sensing signal is a thirty Hertz sinusoidal five volt signal, a current level that corresponds to an effective air gap 50 being within a desired range can be determined. For example only, a first current threshold related to the size of the air gap 50 being within the desired range can be determined. The first current threshold can be indicative of the largest size of the air gap 50 that is within the desired range. Thus, it can be determined that the air gap 50 is within the desired range when the monitored current level is determined to be below the first current threshold. Additionally, a second current threshold related to the size of the air gap 50 being within the desired range can be determined. The second current threshold can be indicative of the smallest size of the air gap 50 that is within the desired range. Thus, it can be determined that the air gap 50 is outside of the desired range when the monitored current level is determined to be below the second current threshold.

In some embodiments where the sensing signal is a voltage signal or current signal, the voltage level and current level, respectively, of the sensing signal remain constant during the assembly procedure so that the only factor which changes is the current or voltage, respectively, supplied to the electromagnetic coil 20. Further, the sensing signal can be chosen to be at a level that prevents undue heating of the windings of the electromagnetic coil 20 during the assembly process to avoid any significant change in the resistance of the electromagnetic coil 20 due to thermal effects which could affect the accuracy of the results obtained from the sensing signal.

Figure 3:
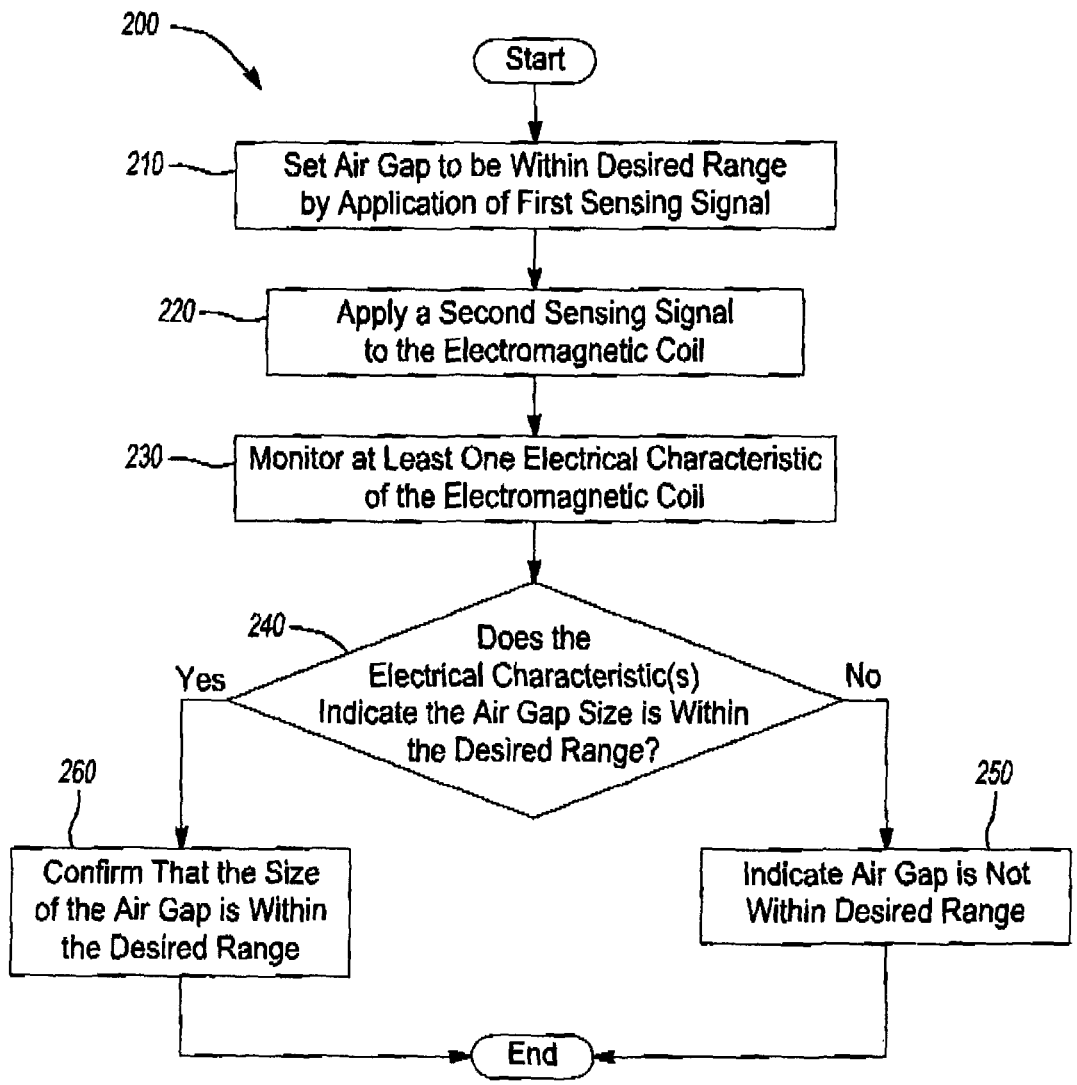
FIG. 3 is a flow chart describing an exemplary method of setting an air gap of an electro-mechanical device (such as the electro-mechanical device of FIG. 1) according to some embodiments of the present disclosure.

Referring now to FIG. 3, a flow chart describing an exemplary method 200 of setting an air gap of an electro-mechanical device according to some embodiments of the present disclosure is illustrated. One skilled in the art will appreciate that, although there are a specific number of steps described in method 200 and these steps are described in a particular order, the method 200 can include more or less steps and the steps can be performed in an order other than as illustrated. The method 200 can be utilized, for example, to assemble the electro-mechanical device 10 including the armature 34 and electromagnetic coil 20 described above.

At step 210, an air gap 50 of the electro-mechanical device 10 is set to be within a desired range by applying a first sensing signal to the electromagnetic coil 20. For example only, the method 100 described above can be utilized to perform step 210. A second sensing signal is applied to the electromagnetic coil 20 (step 220) and at feast one electrical characteristic that is related to the second sensing signal and the size of the effective air gap 50 is monitored (step 230). The method 200 proceeds to step 240 at which it is determined whether the electrical characteristic(s) that is being monitored (step 230) indicates that the size of the air gap 50 is within a desired range. If, at step 240, it is determined that the size of the air gap 50 is not within the desired range, the method 200 proceeds to step 250 at which it is indicated that the air gap is outside of the desired range. If, at step 240, it is instead determined that the size of the air gap 50 is within the desired range, the method 200 proceeds to step 260 at which it is confirmed that the air gap is within the desired range.

Figure 4:
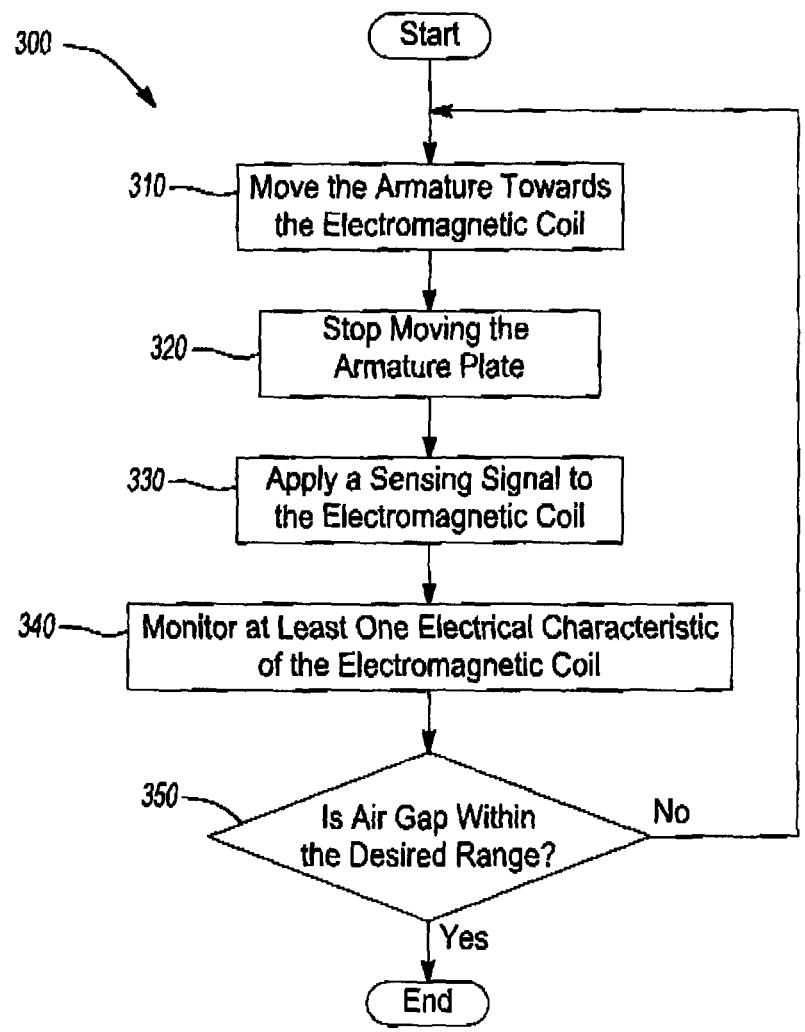
FIG. 4 is a flow chart describing an exemplary method of setting an air gap of an electro-mechanical device (such as the electro-mechanical device of FIG. 1) according to some embodiments of the present disclosure.

Referring now to FIG. 4, a flow chart describing an exemplary method 300 of setting an air gap of an electro-mechanical device according to some embodiments of the present disclosure is illustrated. One skilled in the art will appreciate that, although there are a specific number of steps described in method 300 and these steps are described in a particular order, the method 300 can include more or less steps and the steps can be performed in an order other than as illustrated. The method 300 can be utilized, for example, to assemble the electro-mechanical device 10 including the armature 34 and electromagnetic coil 20 described above.

The armature 34 can be moved towards the electromagnetic coil 20 (step 310) and stopped at a first position to set a first size of the air gap 50 (step 320). With the armature 34 at the first position, a sensing signal can be applied to the electromagnetic coil 20 at step 330. The method 300 proceeds to step 340 at which at least one electrical characteristic of the electromagnetic coil is monitored. The monitored electrical characteristic(s) is related to the sensing signal (such as, a current related to a voltage) and the size of the air gap 50 (due to, e.g., the changed inductance of the electromagnetic circuit formed by the electromagnetic coil 20 and the armature 34). If, at step 350, the monitored electrical characteristic(s) indicates that the air gap 50 is within the desired range, the method 300 ends and the electro-mechanical device 10 is operational. If, however, at step 350 it is determined that the monitored electrical characteristic(s) indicates that the air gap 50 is not within the desired range, the method 300 returns to step 310.

In some embodiments of the present disclosure, the sensing signal applied to the electromagnetic coil 20 is a direct current voltage signal. In these embodiments, the corresponding current supplied to electromagnetic coil 20 can be monitored to determine whether the effective air gap 50 is within the desired size range. Rather than comparing the corresponding current to a current threshold, however, the current can be monitored for a change, such as an indicative drop or dip, that indicates that the size of the air gap 50 is within the desired range. Specifically, once the armature 34 is moved close enough that the magnetic force produced by the electromagnetic coil 20 is sufficient to move the armature 34 into contact with the face 22, a momentary drop in the sensed current occurs before the current again builds to a maximum value. The maximum value of the current measured, before the drop occurs, and the time at which the drop occurs can both be indicative of the size of the air gap 50 between the electromagnetic coil 20 and the armature 34. Additionally or alternatively, the rate of change of the current, before the drop occurs, can be indicative of the size of the air gap 50 between the electromagnetic coil 20 and the armature 34. In these embodiments, the voltage applied to the electromagnetic coil 20 can be relatively high, as the sensing signal is applied intermittently and specific values of the current are not being measured. Therefore, the position of the armature plate 34 and the corresponding size of the air gap 50 at the onset of the application of the sensing signal need not be precise.

Figure 5A:
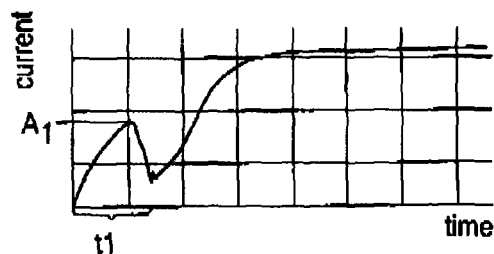
FIGS. 5A, 5B, 5C and 5D show plots of current versus time for a direct current voltage sensing signal applied to the electro-mechanical device of FIG. 1 that includes different air gaps.

FIG. 5A shows an exemplary plot of the current applied to the electromagnetic coil 20 versus time for a sensing signal that is a direct current voltage signal. This plot is for the device 10 with a sensing voltage of fourteen volts. The current undergoes a change (a drop or dip) after first reaching a value of $A_1$. From empirical measurements, it was determined that the effective air gap corresponding to current $A_1$ was equivalent to a physical air gap of 0.6 millimeters.

Figure 5B:
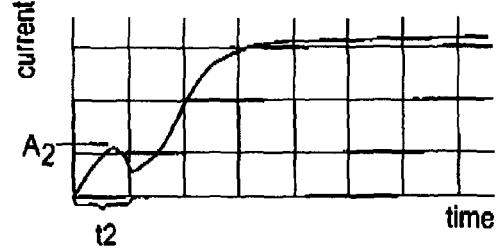

FIG. 5B shows an exemplary plot, similar to that shown in FIG. 5A, of the current applied to the electromagnetic coil 20 versus time for the same sensing signal as that corresponding to FIG. 5A after the armature 34 has been moved closer to the electromagnetic coil 20 (relative to the position corresponding to the plot of FIG. 5A). The current undergoes a change (a sharp dip) after reaching a value of $A_2$, where $A_2$ is less than $A_1$. From empirical measurements, it was determined that the effective air gap corresponding to current $A_2$ was equivalent to a physical air gap of 0.4 millimeters.

Figure 5C:
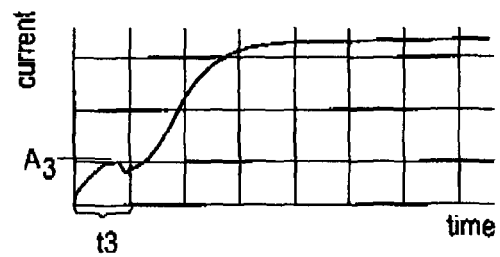

FIG. 5C shows an exemplary plot, similar to those shown in FIGS. 5A and 5B, of the current applied to the electromagnetic coil 20 versus time for the same sensing signal as that corresponding to FIGS. 5A and 5B after the armature 34 has been moved closer to the electromagnetic coil 20 (relative to the position corresponding to the plot of FIG. 5B). The current undergoes a change (a drop or dip) after reaching a value of $A_3$, where $A_3$ is less than $A_2$ which is in turn less than $A_1$. From empirical measurements, it was determined that the effective air gap corresponding to current $A_3$ was equivalent to a physical air gap of 0.2 millimeters.

As can also be seen in the plots of FIGS. 5A, 5B and 5C, the time ($t_1$, $t_2$ and $t_3$, respectively) at which the change in current occurs also occurs sooner as the size of the air gap 50 is decreased. This timing difference can alternatively, or in combination with the current drop measurement, be utilized to determine whether and/or confirm that (steps 240, 250 and 260 in method 200 described above) the size of the air gap 50 is within the desired range. In these embodiments, it is contemplated that a table of maximum currents and corresponding effective air gaps will first be obtained empirically and will be compared to results obtained from the sensing signal when assembling devices 10 to determine whether/confirm that an air gap 50 is within the desired range. Furthermore, the difference between the current value after which the drop occurs ($A_1$, $A_2$ or $A_3$) and the lowest current value before the current again begins to rise can be utilized to determine/confirm that movement of the armature 34 has occurred, i.e., the armature 34 has moved between the engaged and disengaged positions.

The slope of the plots, i.e., the rate of change of the current, of FIGS. 5A, 5B and 5C before the drop in current occurs can also be indicative of the size of the air gap 50. This slope can alternatively, or in combination with the current drop measurement and/or the timing difference described above, be utilized to determine whether and/or confirm that (steps 240, 250 and 260 in method 200 described above) the size of the air gap 50 is within the desired range. In these embodiments, it is contemplated that a table of rates of change in current and corresponding effective air gaps will first be obtained empirically and will be compared to results obtained from the sensing signal when assembling devices 10 to determine whether/confirm that an air gap 50 is within the desired range.

Figure 5D:
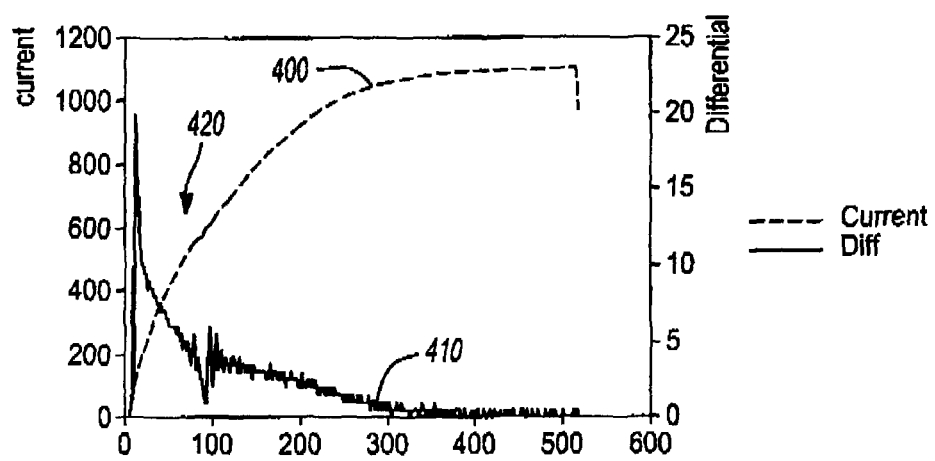

In some embodiments in which the sensing signal that is utilized is a direct current voltage signal, the change (such as the dip described above) in the monitored current may be difficult to detect from the raw measured current level. FIG. 5D shows an exemplary plot of the current 400 applied to the electromagnetic coil 20 versus time for a sensing signal that is a direct current voltage signal, as well as a current differential 410 corresponding to the current 400. The change 420 in the current 400 shown in FIG. 5D does not constitute a large dip or drop and, therefore, may not be easily detectable by monitoring the current 400 itself. The change is, however, detectable when monitoring the current differential 410. Thus, in some embodiments the current differential 410 may comprise the electrical characteristic, or one of the electrical characteristics, that is monitored to determine if the air gap 50 is within the desired range.

It is contemplated that the embodiments utilizing a direct current voltage or current sensing signal will be performed in a step wise manner such that the sensing signal is applied to a de-energized electromagnetic coil 20 each time it is desired to monitor the electrical characteristic(s) (see method 300 above). That is, the armature 34 can be moved to a first position, at which point the sensing signal is applied to the electromagnetic coil 20 and the electrical characteristic(s) is monitored. If the electrical characteristic(s) indicate that the air gap 50 is not within a desired range, the armature 34 is moved closer to the electromagnetic coil 20 and the sensing signal is again applied to the electromagnetic coil 20 and the electrical characteristic(s) is again monitored. This process will be repeated until the effective air gap 50 is within the desired range, at which time the assembly process is complete. Alternatively, if the armature 34 moves towards the electromagnetic coil 20 at a speed that is sufficiently low, the sensing signal can be applied to, and removed from, the electromagnetic coil 20 at appropriate intervals during the movement to obtain the desired electrical characteristic(s) that can be used to determine when the effective air gap 50 is within the desired range.

As described above, when the electromagnetic coil 20 is de-energized a return spring 36 can bias the armature plate 34 away from the face 22. The proper operation of the return spring 36 can be confirmed by applying a sensing signal to the electromagnetic coil 20 and monitoring at least one electrical characteristic related to the sensing signal. For example only, after the air gap 50 has been to set to be within the desired range (for example, by utilizing one of methods 100, 200 or 300 described above), a direct current voltage can be applied to the electromagnetic coil 20 to bring the armature 34 into contact with the electromagnetic coil 20. Assuming that movement of the armature 34 occurs, as shown in FIGS. 5A, 5B and 5C the resulting current will undergo a change (a drop or dip) after first reaching a value of $A_1$, $A_2$ and $A_3$, respectively. From empirical measurements, it can be determined that the spring force corresponding to each of currents $A_1$, $A_2$, and $A_3$ is within an acceptable range.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

We claim:

1. A method of setting an air gap between an electromagnetic coil and an armature of an electro-mechanical device to be within a desired range, the method comprising:
   applying a sensing signal to the electromagnetic coil;
   monitoring at least one electrical characteristic of the electromagnetic coil, the at least one electrical characteristic being related to a size of the air gap and the sensing signal;
   moving the armature towards the electromagnetic coil to reduce the size of the air gap; and
   stopping movement of the armature towards the electromagnetic coil when the at least one electrical characteristic indicates the size of the air gap is within the desired range.

2. The method of claim 1, wherein the sensing signal comprises an alternating current voltage signal.

3. The method of claim 2, wherein the at least one electrical characteristic comprises a current drawn by the electromagnetic coil based on the alternating current voltage signal.

4. The method of claim 3, further comprising:
   determining a first current threshold, the first current threshold being related to the size of the air gap being within the desired range;
   comparing the current drawn by the electromagnetic coil to the first current threshold; and
   determining that the size of the air gap is within the desired range when the current drawn by the electromagnetic coil is below the first current threshold.

5. The method of claim 4, further comprising:
   determining a second current threshold, the second current threshold being related to the size of the air gap being within the desired range;
   comparing the current drawn by the electromagnetic coil to the second current threshold; and
   determining that the size of the air gap is outside of the desired range when the current drawn by the electromagnetic coil is below the second current threshold.

6. The method of claim 2, further comprising applying a second sensing signal to the electromagnetic coil to confirm that the size of the air gap is within the desired range.

7. The method of claim 6, wherein the second sensing signal comprises a direct current voltage signal.

8. The method of claim 1, wherein the sensing signal comprises a direct current voltage signal.

9. The method of claim 8, wherein the at least one electrical characteristic comprises a current drawn by the electromagnetic coil based on the direct current voltage signal.

10. The method of claim 9, further comprising: (i) detecting a change in the current drawn by the electromagnetic coil, and (ii) stopping movement of the armature towards the electromagnetic coil when the change indicates the size of the air gap is within the desired range.

11. The method of claim 10, wherein the change comprises a drop in the current drawn by the electromagnetic coil.

12. The method of claim 11, wherein stopping movement of the armature towards the electromagnetic coil when the change indicates the size of the air gap is within the desired range comprises: (i) determining a time of the drop in the current drawn by the electromagnetic coil, and (ii) stopping movement of the armature towards the electromagnetic coil when the time indicates the size of the air gap is within the desired range.

13. The method of claim 1, wherein the at least one electrical characteristic comprises an inductance of the electromagnetic coil.

14. A method of setting an air gap between an electromagnetic coil and an armature of an electro-mechanical device to be within a desired range, the method comprising:
   applying an alternating current voltage signal to the electromagnetic coil;

monitoring a first current drawn by the electromagnetic coil based on the alternating current voltage signal;

moving the armature towards the electromagnetic coil to reduce the size of the air gap;

determining a first current threshold, the first current threshold being related to the size of the air gap being within the desired range;

comparing the first current drawn by the electromagnetic coil to the first current threshold;

determining that the size of the air gap is within the desired range when the first current drawn is below the first current threshold;

stopping movement of the armature towards the electromagnetic coil when the size of the air gap is within the desired range;

confirming that the size of the air gap is within the desired range by: (i) applying a direct current voltage signal to the electromagnetic coil and (ii) detecting a change in a second current drawn by the electromagnetic coil based on the direct current voltage signal.

* * * * *